(12) United States Patent
Pavlich

(10) Patent No.: US 9,922,510 B2
(45) Date of Patent: Mar. 20, 2018

(54) ALERT BASED ON DETECTION OF UNEXPECTED WIRELESS DEVICE

(71) Applicant: ARRIS Enterprises, Inc., Suwanee, GA (US)

(72) Inventor: Bryan Pavlich, Suwanee, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/065,951

(22) Filed: Mar. 10, 2016

(65) Prior Publication Data

US 2016/0284186 A1   Sep. 29, 2016

Related U.S. Application Data

(60) Provisional application No. 62/136,787, filed on Mar. 23, 2015.

(51) Int. Cl.
| | | |
|---|---|---|
| *G08B 21/00* | (2006.01) | |
| *G08B 13/00* | (2006.01) | |
| *H04W 4/02* | (2018.01) | |
| *H04W 24/04* | (2009.01) | |
| *H04W 64/00* | (2009.01) | |

(52) U.S. Cl.
CPC ............ *G08B 13/00* (2013.01); *H04W 4/023* (2013.01); *H04W 24/04* (2013.01); *H04W 64/006* (2013.01)

(58) Field of Classification Search
CPC ..... G08B 13/00; H04W 24/04; H04W 64/006

USPC ......................................................... 340/552
See application file for complete search history.

(56) References Cited

U.S. PATENT DOCUMENTS

| | | | | |
|---|---|---|---|---|
| 2006/0125631 | A1* | 6/2006 | Sharony | G06K 17/00 340/539.13 |
| 2007/0035380 | A1* | 2/2007 | Overhultz | G06Q 10/087 340/5.9 |
| 2008/0122626 | A1* | 5/2008 | Ehrman | G06Q 10/08 340/572.1 |
| 2011/0029359 | A1* | 2/2011 | Roeding | G06Q 30/00 705/14.1 |
| 2012/0127976 | A1* | 5/2012 | Lin | G01S 13/82 370/338 |
| 2012/0256728 | A1* | 10/2012 | Bajic | G06K 7/10019 340/10.1 |

\* cited by examiner

*Primary Examiner* — Mark Rushing
(74) *Attorney, Agent, or Firm* — Bart A. Perkins

(57) ABSTRACT

Methods, systems, and computer readable media can be operable to generate an alert in response to a detection of an unexpected wireless device within a premises. An access device may receive a communication from a wireless device and may retrieve identification information associated with the wireless device from the communication. The access device may compare the retrieved identification information to identification information associated with one or more known devices, and if the retrieved identification information does not match the identification information associated with any of the known devices, the access device may identify the wireless device as an unexpected wireless device. The access device may output an alert providing a notification that an unexpected wireless device has been detected within an associated premises.

17 Claims, 6 Drawing Sheets

ALERT BASED ON DETECTION OF UNEXPECTED WIRELESS DEVICE

CROSS REFERENCE TO RELATED APPLICATION

This application is a non-provisional application claiming the benefit of U.S. Provisional Application Ser. No. 62/136,787, entitled "Wireless-Enhanced Home Security," which was filed on Mar. 23, 2015, and is incorporated herein by reference in its entirety.

TECHNICAL FIELD

This disclosure relates to the output of an alert upon the detection of an unexpected wireless device within a premises.

BACKGROUND

Prevention and detection of premises intrusions has always been a priority for any premises owner. However, most security plans and measures have weaknesses or vulnerabilities. One problem area found in current security plans involves capturing evidence of an intrusion. Many security systems fail to provide a premises owner or law enforcement personnel with satisfactory evidence for identifying an intruder. For example, an intruder can easily disguise his or her identity from being captured by a video security system by simply wearing a mask. Moreover, video quality may prevent a successful identification of an intruder.

It is far too often the case that visual and physical evidence of an intruder's presence within a premises fail to provide a positive identification of a suspect. Therefore, it is desirable to improve upon methods and systems for detecting, identifying, and alarming the presence of an intruder within a premises.

BRIEF DESCRIPTION OF THE DRAWINGS

Like reference numbers and designations in the various drawings indicate like elements.

DETAILED DESCRIPTION

Figure 1:
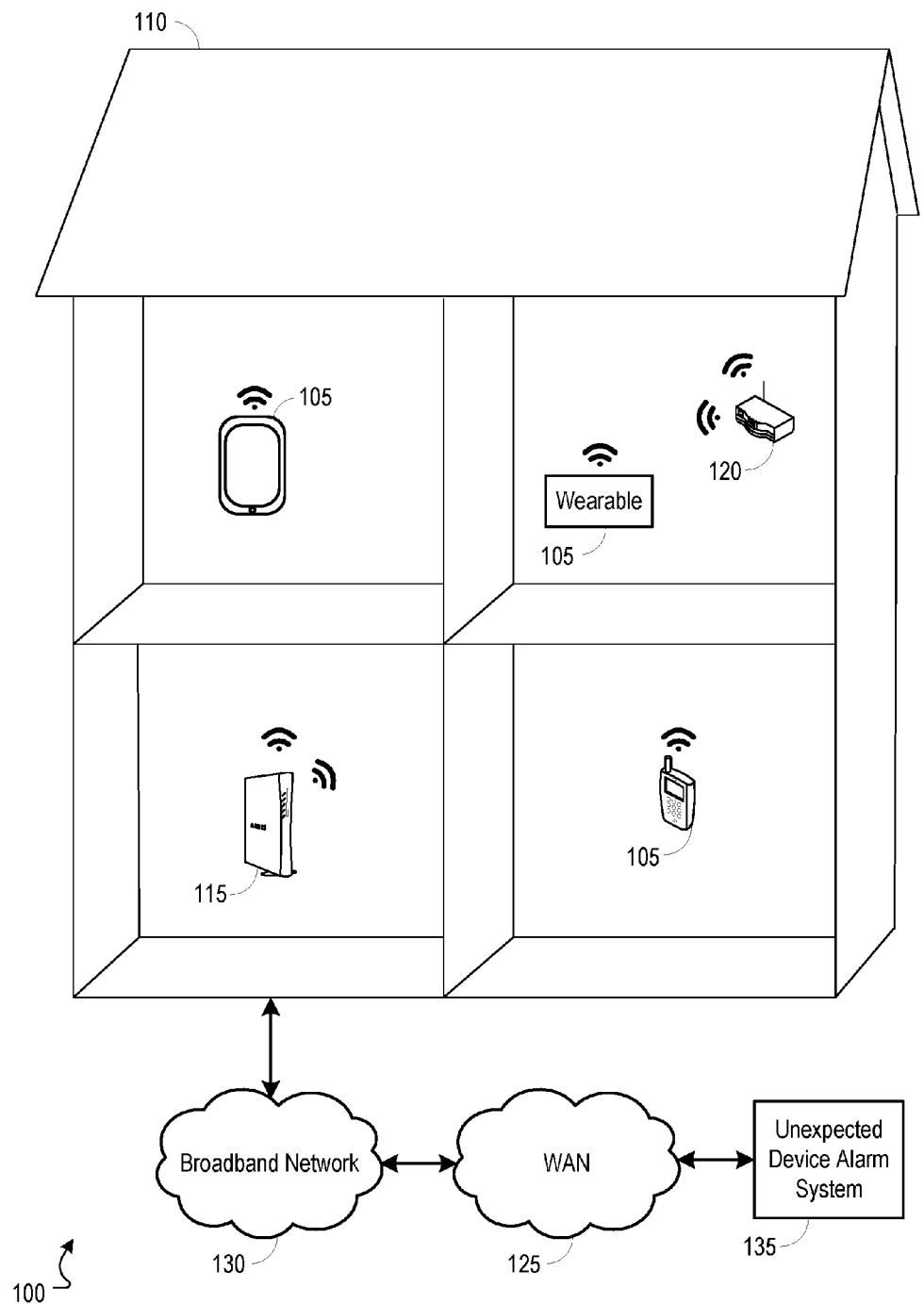
FIG. 1 is a block diagram illustrating an example network environment operable to generate an alert in response to a detection of an unexpected wireless device within a premises.

It is desirable to improve upon methods and systems for detecting and alerting the presence of an intruder within a premises. Methods, systems, and computer readable media can be operable to generate an alert in response to a detection of an unexpected wireless device within a premises. An access device may receive a communication from a wireless device and may retrieve identification information associated with the wireless device from the communication. The access device may compare the retrieved identification information to identification information associated with one or more known devices, and if the retrieved identification information does not match the identification information associated with any of the known devices, the access device may identify the wireless device as an unexpected wireless device. The access device may output an alert providing a notification that an unexpected wireless device has been detected within an associated premises.

An embodiment of the invention described herein may include a method comprising: (a) receiving a communication from a wireless device; (b) retrieving device identification information from the communication, wherein the device identification information is associated with the wireless device; (c) determining that the retrieved device identification information does not match device identification information associated with any of one or more known devices; (d) identifying the wireless device as an unexpected wireless device based on the determination that the retrieved device identification information does not match device identification information associated with any of the one or more known devices; and (e) outputting an alert, wherein the alert comprises a notification of the identification of the wireless device as an unexpected wireless device.

According to an embodiment of the invention, the method described herein further comprises the steps of retrieving an indication of the strength of a signal between the wireless device and one or more access devices, and, based upon the measured strength of the signal between the wireless device and the one or more access devices, determining a location of the wireless device relative to the one or more access devices, wherein the location of the wireless device relative to the one or more access devices comprises a distance between the wireless device and the one or more access devices and a direction of the wireless device with respect to one or more of the access devices.

According to an embodiment of the invention, the method described herein further comprises the steps of storing the retrieved device identification information, and storing a time at which the communication was received from the wireless device.

According to an embodiment of the invention, the alert is output to a remote server.

According to an embodiment of the invention, the alert is output to a security device within a corresponding premises, the alert causing the activation of the security device.

According to an embodiment of the invention, the communication comprises a probe request message.

According to an embodiment of the invention, the retrieved device identification information comprises a media access control (MAC) address.

An embodiment of the invention described herein may include an apparatus comprising: (a) one or more interfaces configured to be used to receive a communication from a wireless device; and (b) one or more modules configured to: (i) retrieve device identification information from the communication, wherein the device identification information is associated with the wireless device; (ii) determine that the retrieved device identification information does not match device identification information associated with any of one or more known devices; and (iii) identify the wireless device as an unexpected wireless device based on the determination that the retrieved device identification information does not match device identification information associated with any of the one or more known devices; and (c) wherein the one or more interfaces are further configured to be used to output an alert, the alert comprising a notification of the identification of the wireless device as an unexpected wireless device.

According to an embodiment of the invention, the one or more interfaces are further configured to be used to retrieve an indication of the strength of a signal between the wireless device and one or more access devices, and the one or modules are further configured to, based upon the measured strength of the signal between the wireless device and the one or more access devices, determine a location of the wireless device relative to the one or more access devices, wherein the location of the wireless device relative to the one or more access devices comprises a distance between the wireless device and the one or more access devices and a direction of the wireless device with respect to one or more of the access devices.

An embodiment of the invention described herein may include one or more non-transitory computer readable media having instructions operable to cause one or more processors to perform the operations comprising: (a) receiving a communication from a wireless device, wherein the communication is received by an access device operating in a mode that requires the output of an alert upon the reception of a communication from a wireless device; (b) identifying the wireless device as an unexpected wireless device; and (c) outputting an alert, wherein the alert comprises a notification that an unexpected wireless device has been detected within a premises associated with the access device.

According to an embodiment of the invention, the instructions are further operable to cause one or more processors to perform the operations comprising retrieving an indication of the strength of a signal between the wireless device and the access device, and, based upon the measured strength of the signal between the wireless device and the access device, determining a location of the wireless device relative to the location of the access device, wherein the location of the wireless device relative to the location of the access device comprises a distance between the wireless device and the access device and a direction of the wireless device with respect to the location of the access device.

According to an embodiment of the invention, the instructions are further operable to cause one or more processors to perform the operations comprising: (a) retrieving device identification information from the communication, wherein the device identification information is associated with the wireless device; (b) storing the retrieved device identification information; and (c) storing a time at which the communication was received from the wireless device.

FIG. 1 is a block diagram illustrating an example network environment 100 operable to generate an alert in response to a detection of an unexpected wireless device within a premises. In embodiments, video, voice, and/or data services may be delivered to one or more client devices 105. Client devices 105 may include a television, mobile device, tablet, computer, gaming console, wearable device (e.g., smart watch, glasses, etc.) and any other device operable to receive video, voice, and/or data services. Client devices 105 may further include appliances, personal devices, health monitoring devices, and any other device capable of communicating with another device or network (e.g., Internet of things (IoT) devices).

Multiple services may be delivered to client devices 105 within a subscriber premises 110 over one or more local networks (e.g., coaxial network, a local area network (LAN), wireless local area network (WLAN), personal area network (PAN), Multimedia over Coax Alliance (MoCA) network, mobile hotspot network, and any other interconnectivity operable to route communications to and from client devices 105), and delivery of the multiple services may be facilitated by one or more access devices. Access devices may include any device configured to receive and/or deliver communications or services to one or more client devices 105. For example, access devices may include a gateway device 115, a network extender 120, a router, or any other access point. It should be understood that one or more access devices may be integrated with each other or with other devices. For example, a client device 105 may operate as a station or an access point.

It should be understood that delivery of the multiple services over the local network(s) may be accomplished using a variety of standards and formats. It will be appreciated by those skilled in the relevant art that client devices 105 may be capable of interacting and communicating with each other and/or with an access point over various wired and wireless communication standards (e.g., Wi-Fi, Bluetooth, ZigBee, etc.).

Multiple services may be provided to a subscriber premises 110 from a WAN 125 through a broadband network 130. The broadband network 130 may include, for example, a hybrid fiber-coaxial (HFC) network, fiber network, mobile network, digital subscriber line (DSL) network, satellite network, and any other network operable to deliver services to a subscriber premises 110.

Many wireless devices capable of communicating with an access device are designed so as to be carried on the person of individuals. For example, at any given time, an individual may be carrying a mobile device, a tablet, and/or various other personal devices (e.g., wearables such as smart watches and smart glasses) that have the capability to connect to and communicate over a local network provided by an access device. A wireless device carried by an individual may automatically communicate with an access device when the wireless device is within a wireless range of the access device. For example, a wireless device with an active radio may periodically transmit messages searching for a local access device with which to associate. Therefore, if an intruder enters a premises, and the intruder is carrying a wireless device, an access device within the premises may receive a communication from the intruder's wireless device, recognize that the wireless device is unfamiliar, log any identifying information carried by the communication, and output an alert including a notification of the intruder's presence within the premises.

In embodiments, a security mode may be enabled/disabled at one or more access devices (e.g., gateway device 115, network extender 120, etc.) within a subscriber premises 110. For example, a security mode may be enabled at a gateway device 115, and the gateway device 115 may enable a security mode at each of one or more network extenders 120 associated with the gateway device 115. While a security mode is enabled at an access device, the access device may monitor communications received from wireless devices, retrieve a unique identifier from the received communications, and if a retrieved unique identifier is not found within a list of unique identifiers associated with known devices, the access device may generate and output an alert indicating the detection of an unexpected wireless device within the subscriber premises 110. A security mode may be manually enabled/disabled at an access device by a user. For example, a user, through a user interface associated with one or more access devices, may enable or disable a security mode at the one or more access devices (e.g., by enabling the security mode when leaving the subscriber premises and disabling the security mode when returning to the subscriber premises). The user may be provided with various options for enabling or disabling a security mode. For example, the user may enable the security mode for a predetermined number of days by placing the one or more access devices in a vacation mode, or the user may enable the security mode for a predetermined number of hours by placing the one or more access devices in a work/school mode. In embodiments, a security mode may be automatically enabled/disabled at an access device. For example, one or more access devices within a subscriber premises 110 may be configured with a schedule controlling the enabling/disabling of a security mode at the one or more access devices (e.g., a user may create a schedule that automatically enables the security mode for the daytime hours during which a subscriber expects the premises to be empty, during the night, etc.). It should be understood that the one or more access devices may be configured to automatically enable/disable a security mode based on the occurrence of predetermined events (e.g., locking/unlocking of an exterior door, opening/closing of a garage door, etc.).

In embodiments, an access device (e.g., gateway device 115, network extender 120, etc.) may be configured to monitor communications received from one or more wireless stations (e.g., client devices 105) that are within a wireless range provided by the access device. The access device may retrieve device identification information from a received communication, wherein the device identification information includes a unique identifier (e.g., media access control (MAC) address, etc.) associated with the wireless station from which the communication was received. For example, while a radio or other wireless transmitter associated with a wireless station is enabled, the wireless station may periodically output a request for identification of local access devices (e.g., probe request message transmitted from a station during the 802.11 discovery process).

In embodiments, the access device may retrieve a unique identifier carried by the communication and may compare the retrieved unique identifier to a list of identifiers associated with one or more known devices. Known devices may include a group of devices designated by a subscriber as wireless devices that are expected to be found within the range of a wireless network provided by one or more access devices within the subscriber premises 110 (e.g., wireless devices owned by residents of the subscriber premises 110 or guests of the subscriber premises 110), and/or known devices may include one or more wireless devices that have been identified by an access device a predetermined number of times or over a predetermined duration of time. For example, a user may configure an access device with a list of unique identifiers associated with known devices as determined by the user, and/or the access device may automatically add a unique identifier associated with a wireless device to the known device list when the access device receives a predetermined number of communications (e.g., probe requests) from the wireless device, when the wireless device successfully joins a public or private network provided by the access device or by another access device within the subscriber premises 110, when the access device receives a communication from the wireless device during a period of time when a security setting at the wireless device is disabled, when the access device receives communications from the wireless device during a predetermined number of consecutive time periods (e.g., communications are received from the wireless device for a predetermined number of consecutive hours, days, etc.), and/or based on various other events.

If the retrieved unique identifier is not found within the list of identifiers associated with known devices, the access device may generate an alert indicating the detection of an unexpected wireless device within the subscriber premises 110. The access device may output an alert to an upstream alarm monitoring system (e.g., unexpected device alarm system 135), to a subscriber device (e.g., mobile device, tablet, or other personal device associated with the subscriber), to an alarm system within the subscriber premises 110, to an emergency services provider, or to another individual or entity. In embodiments, the access device may output an alert of the detection of the unexpected wireless device to one or more other devices within the subscriber premises 110. For example, the access device may control the functioning of one or more devices connected to a home network based on the detection of an unexpected wireless device (e.g., turning on security lights in and/or around the premises, turning on security cameras positioned in and/or around the premises, sounding an alarm system, establishing a communication path between the premises and a home security provider, etc.).

In embodiments, if the retrieved unique identifier associated with a wireless device is not found within the list of identifiers associated with known devices, the access device may determine a location of the wireless device within the subscriber premises 110. The access device may retrieve a signal strength from the communication received from the wireless device and may determine a proximity of the wireless device to the access device based on the retrieved signal strength. The access device may determine a relative direction of the wireless device by measuring the strength of a signal received from the wireless device across a plurality of antennas/receivers associated with the access device (e.g., in the case of a multiple-input multiple-output (MIMO) access device) or across a plurality of segments of a single antenna/receiver (e.g., in the case of a single-input single-output (SISO) access device). For example, the location of the wireless device may be triangulated using the measured signal strengths at each of the plurality of antennas/receivers or plurality of antenna/receiver segments. In embodiments, the location of the wireless device may be determined based upon signal strengths associated with the wireless device as received in communications at a plurality of different access devices. For example, the signal strengths retrieved at the plurality of access devices may be recovered by a single device, and the location of the wireless device may be triangulated using the retrieved signal strengths and relative positions of the access devices at which the signal strengths were retrieved.

In embodiments, when an unexpected wireless device (e.g., a wireless device having a unique identifier that is not found within the list of identifiers associated with known devices) is detected within the subscriber premises 110, an access device may log information associated with the detection of the unexpected wireless device. For example, the access device may log the retrieved unique identifier associated with the unexpected wireless device, the retrieved signal strength associated with a communication received from the unexpected wireless device, the determined location of the unexpected wireless device, the time at which the unexpected wireless device was detected, the duration for which the unexpected wireless device was detected within the subscriber premises 110, and various other information. In embodiments, when an unexpected wireless device is detected within the subscriber premises, one or more access devices may continue to track and log the location(s) and movement(s) of the unexpected wireless device.

In embodiments, an access device may be configured with a predetermined signal strength threshold, wherein the signal strength of a communication received from a wireless device is compared against the predetermined signal strength threshold. If the signal strength is less than the predetermined threshold, the access device may determine that it is unnecessary to check whether the device from which the communication was received is a known device, or the access device may refrain from outputting an alert indicating the detection of an unexpected wireless device within the subscriber premises 110 if the device is determined not to be a known device. It should be understood that the signal strength threshold may be enabled or disabled and may be tuned by a user or MSO-controlled entity according to the location of the access device within the subscriber premise 110 and/or the anticipated presence of remote client devices within the range of the access device. For example, a user may configure an access device located near a public space, such as a hallway, with a higher signal strength threshold than an access device located at an area that is not expected to have much visibility outside of the subscriber premises 110 (e.g., a basement).

In embodiments, an access device may be configured with a predetermined time duration threshold, wherein the access device may refrain from outputting an alert indicating the detection of an unexpected wireless device within the subscriber premises 110 until the unexpected wireless device has been detected by the access device for a period of time that is greater than the time duration threshold. It should be understood that the predetermined time duration threshold may be enabled or disabled and may be tuned by a user or MSO-controlled entity.

Figure 2:
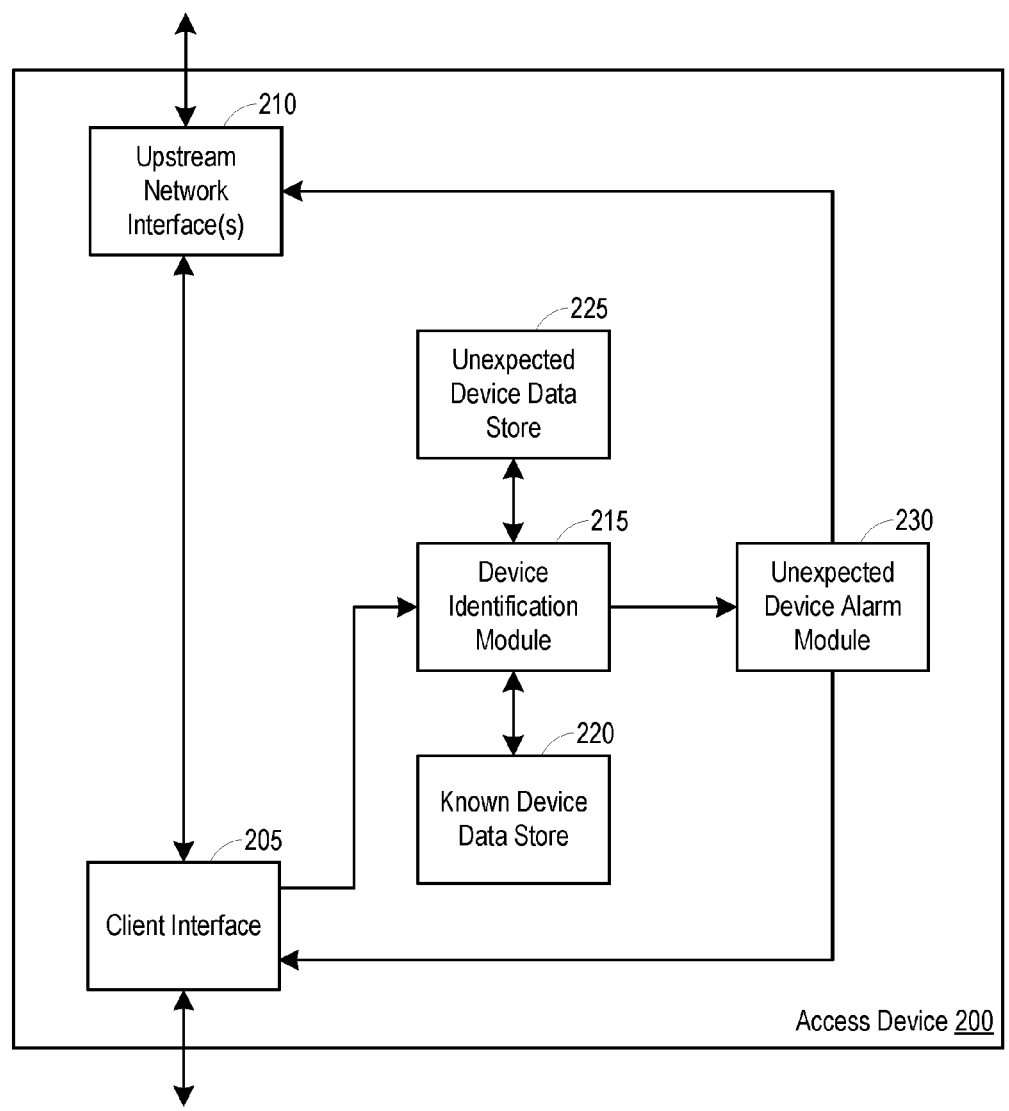
FIG. 2 is a block diagram illustrating an example access device operable to generate an alert in response to a detection of an unexpected wireless device within a premises.

FIG. 2 is a block diagram illustrating an example access device 200 operable to generate an alert in response to a detection of an unexpected wireless device within a premises. The access device 200 may include a client interface 205, one or more upstream network interfaces 210, a device identification module 215, a known device data store 220, an unexpected device data store 225, and an unexpected device alarm module 230. In embodiments, the access device 200 may be a gateway device 115 of FIG. 1, a network extender 120 of FIG. 1, a router, or any other access point.

In embodiments, a client interface 205 may provide an interface for facilitating communications between the access device 200 and one or more client devices (e.g., client devices 105 of FIG. 1 such as mobile devices, tablets, wearable devices, set-top boxes, computers, televisions, IoT devices, etc.). For example, multiple services may be output from the access device 200 through the client interface 205 and may be delivered to one or more client devices 105 over a local network (e.g., LAN, WLAN such as Wi-Fi, MoCA, etc.). It should be understood that a client interface 205 may be configured to receive and/or output communications using various communication techniques, protocols, and standards (e.g., Ethernet, Wi-Fi, MoCA, twisted pair, etc.). Wireless communications may be transmitted to and received from one or more client devices 105 through the client interface 205.

In embodiments, the client interface 205 may include one or more radio interfaces each with one or more antennas for transmitting and receiving wireless communications. Each radio interface within the client interface 205 may include a multiple input/multiple output (MIMO) antenna configuration (e.g., 2×2, 3×3, 4×4, etc.) or a single input/single output (SISO) antenna configuration (e.g., 1×1).

In embodiments, the access device 200 may receive services for delivery to one or more client devices 105 and/or may communicate with one or more upstream devices (e.g., gateway device 115) or network elements (e.g., unexpected device alarm system 135 of FIG. 1) through one or more upstream network interfaces 210. The one or more upstream network interfaces 210 may include various interface types associated with various protocols and/or standards. The one or more upstream network interfaces 210 may be configured to receive downstream communications and to output upstream communications.

In embodiments, the device identification module 215 may be configured to monitor communications received from one or more wireless stations (e.g., client devices 105) that are within a wireless range provided by the access device 200. The device identification module may retrieve device identification information from a received communication, wherein the device identification information includes a unique identifier (e.g., media access control (MAC) address, etc.) associated with the wireless station from which the communication was received. The device identification module 215 may monitor communications received through the client interface 205 while the access device 200 is operating in a security mode (e.g., security mode at the access device 200 is manually or automatically enabled).

In embodiments, the device identification module 215 may retrieve a unique identifier carried by the communication and may compare the retrieved unique identifier to a list of identifiers associated with one or more known devices. The list of identifiers associated with one or more known devices may be stored at a known device data store 220. A user may manually input identifiers of known devices into the list of known device identifiers, and/or the device identification module 215 may automatically add a unique identifier associated with a wireless device to the known device list stored at the known device data store 220 when the access device 200 receives a predetermined number of communications (e.g., probe requests) from the wireless device, when the wireless device successfully joins a public or private network provided by the access device 200 or by another access device within a premises, when the access device 200 receives a communication from the wireless device during a period of time when a security setting at the wireless device 200 is disabled, when the access device 200 receives communications from the wireless device during a predetermined number of consecutive time periods (e.g., communications are received from the wireless device for a predetermined number of consecutive hours, days, etc.), and/or based on various other events. It should be understood that the list of known device identifiers may be stored at various other locations or devices (e.g., another access device, a remote data store, an upstream network or server, etc.).

In embodiments, if the retrieved unique identifier is not found within the list of identifiers associated with known devices, the device identification module 215 may notify the unexpected device alarm module 230 that an unexpected wireless device has been detected, and the unexpected device alarm module 230 may generate an alert indicating the detection of an unexpected wireless device within the subscriber premises. The unexpected device alarm module 230 may output an alert to an upstream alarm monitoring system (e.g., unexpected device alarm system 135 of FIG.

1), to a subscriber device (e.g., STB, mobile device, tablet, or other personal device associated with the subscriber), to an alarm system within the subscriber premises, to an emergency services provider, or to another individual or entity. In embodiments, the unexpected device alarm module 230 may output an alert of the detection of the unexpected wireless device to one or more other devices within the subscriber premises. For example, the unexpected device alarm module 230 may control the functioning of one or more devices connected to a home network based on the detection of an unexpected wireless device (e.g., turning on security lights in and/or around the premises, turning on security cameras positioned in and/or around the premises, sounding an alarm system, establishing a communication path between the premises and a home security provider, etc.). In embodiments, the unexpected device alarm module 230 may output an alert to one or more other access devices within an associated subscriber premises, wherein the alert includes a unique identifier associated with the unexpected device and informs the one or more other access devices to look for and log any identification of or communication received from the unexpected device. For example, the alert may place the one or more other access devices in an alert or caution mode, wherein the access devices immediately log an identification of the unexpected device without first checking a known device list or otherwise making a determination whether the device is known. The unexpected device alarm module 230 may output an alert through one or more upstream network interfaces 210 and/or the client interface 205.

In embodiments, if the retrieved unique identifier associated with a wireless device is not found within the list of identifiers associated with known devices, the device identification module 215 may determine a location of the wireless device within the subscriber premises. The device identification module 215 may retrieve a signal strength from the communication received from the wireless device and may determine a proximity of the wireless device to the access device 200 based on the retrieved signal strength. The device identification module 215 may determine a relative direction of the wireless device by retrieving measurements of the strength of a signal received from the wireless device across a plurality of antennas/receivers associated with the access device 200 (e.g., in the case of a multiple-input multiple-output (MIMO) access device) or across a plurality of segments of a single antenna/receiver (e.g., in the case of a single-input single-output (SISO) access device). For example, the location of the wireless device may be triangulated using the measured signal strengths at each of the plurality of antennas/receivers or plurality of antenna/receiver segments. In embodiments, the device identification module 215 may retrieve signal strength measurements from one or more other access devices within the subscriber premises, wherein each respective signal strength measurement is a measurement of the strength of a signal associated with a communication received from the wireless device at a respective access device. The device identification module 215 may determine the location of the wireless device based upon the signal strengths associated with the wireless device as received in communications at the one or more other access devices. For example, the signal strengths retrieved at the access device 200 and the one or more other access devices may be triangulated using the retrieved signal strengths and relative positions of the access devices at which the signal strengths were retrieved.

In embodiments, the location of an unexpected device within a subscriber premises may be determined based upon the signal strength between the unexpected device and an access device that identifies the unexpected device, and may be further based upon an association between the access device and a region within the subscriber premises. For example, if the signal strength between an unexpected device and an access device located in the basement of a premises is greater than the signal strength between the unexpected device and an access device located on the first floor, then the determination may be made that the unexpected device is located somewhere in the basement of the premises, or at least that the unexpected device was located at a location closer to the basement access device than the first floor access device. Relative signal strength between multiple access devices may be further used to track the movement of the unexpected device throughout the premises.

In embodiments, if the retrieved unique identifier associated with a wireless device is not found within the list of identifiers associated with known devices, the device identification module 215 may log information associated with the detection of the wireless device. The device identification module 215 may identify the wireless device as an unexpected wireless device and may log information associated with the detection of the unexpected wireless device at the unexpected device data store 225. Information associated with the detection of the unexpected wireless device may include the retrieved unique identifier associated with the unexpected wireless device, the retrieved signal strength associated with a communication received from the unexpected wireless device, the determined location of the unexpected wireless device, the time at which the unexpected wireless device was detected, the duration for which the unexpected wireless device was detected within the subscriber premises, and various other information.

Figure 3:
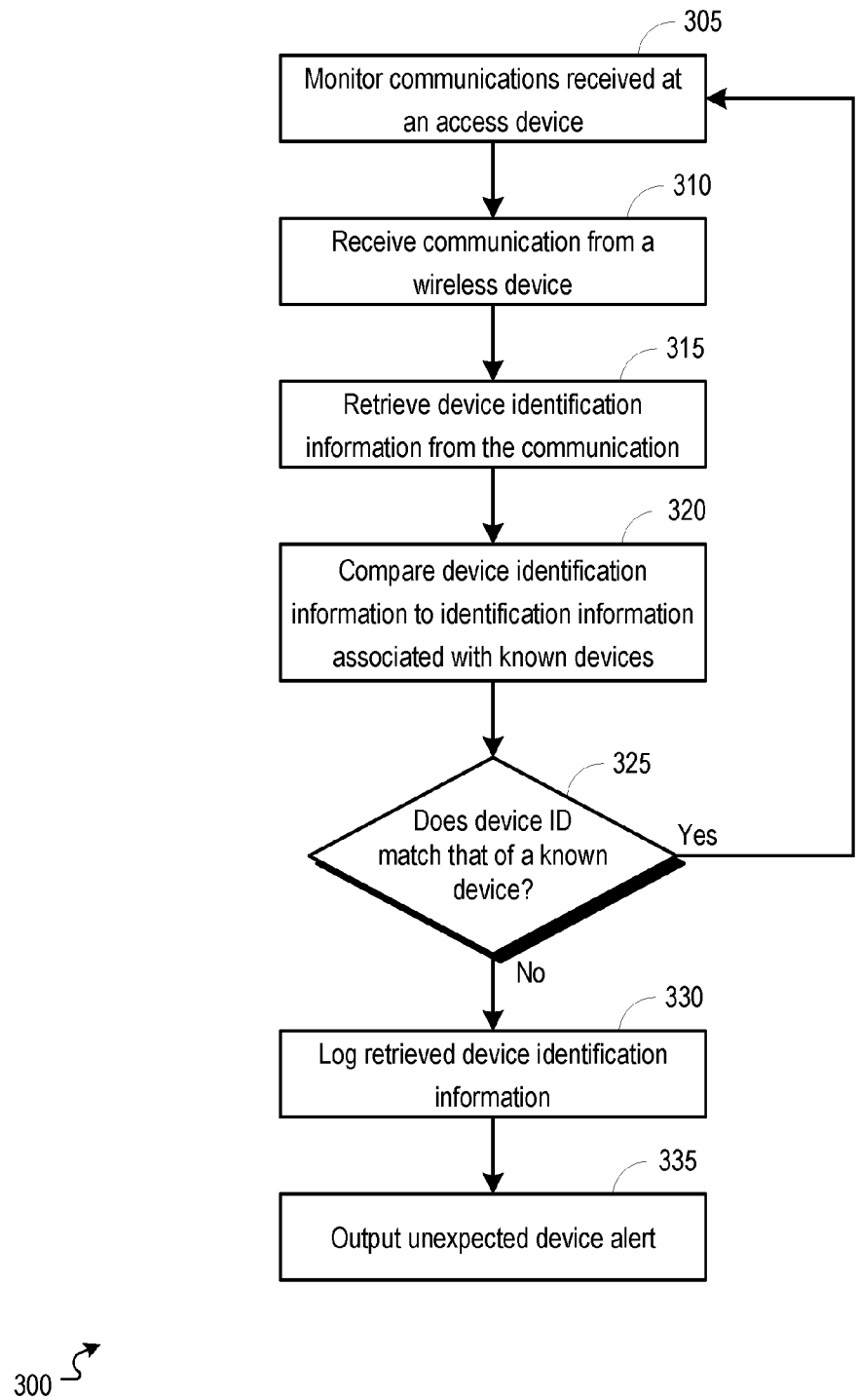
FIG. 3 is a flowchart illustrating an example process operable to generate an alert in response to a detection of an unexpected wireless device within a premises.

FIG. 3 is a flowchart illustrating an example process 300 operable to generate an alert in response to a detection of an unexpected wireless device within a premises. The process 300 may begin at 305, when received communications are monitored at an access device. An access device (e.g., gateway device 115 of FIG. 1, a network extender 120 of FIG. 1, a router, or any other access point) may monitor communications received from one or more wireless devices or stations when a security mode is enabled at the access device. For example, a user may manually enable a security mode at the access device or the access device may automatically (e.g., during a predetermined period of time, or upon the occurrence of a conditional event) enable a security mode. The access device may monitor communications received from wireless devices that are not associated with the access device (e.g., not paired or not authenticated with the access device) as well as communications from wireless devices that are associated with the access device (e.g., paired or authenticated with the access device).

At 310, a communication may be received from a wireless device (e.g., client device 105 of FIG. 1). In embodiments, the communication may be a request for identification of local access devices (e.g., probe request message transmitted from a station during the 802.11 discovery process) or any other wireless communication received at a wireless interface (e.g., client interface 205 of FIG. 2) of the access device.

At 315, device identification information may be retrieved from the received communication. Device identification information may be retrieved from the communication, for example, by a device identification module 215 of FIG. 2. In embodiments, device identification information may be carried within the received communication and may include a unique identifier (e.g., MAC address or other identifier) associated with the wireless device from which the communication was received.

At 320, the retrieved device identification information may be compared to identification information associated with one or more known devices. In embodiments, a device identification module 215 may compare the retrieved device identification information against identification information associated with one or more known devices (e.g., identification information such as MAC addresses or other unique device identifiers stored at a known device data store 220 of FIG. 2 or other location, device, or server). Known devices may include a group of devices designated by a subscriber, technician, MSO, or other entity as wireless devices that are expected to be found within the range of a wireless network provided by one or more access devices within a subscriber premises (e.g., wireless devices owned by residents of the subscriber premises or guests of the subscriber premises), and/or known devices may include one or more wireless devices that have been identified by an access device a predetermined number of times or over a predetermined duration of time. It should be understood that an access device may be configured with a list of known devices or an update to known devices by a subscriber, technician, installer, or other MSO-controlled entity.

At 325, a determination may be made whether the identification information retrieved from the received communication matches the identification information of a known device. The determination whether the retrieved identification information matches the identification information of a known device may be made, for example, by a device identification module 215. If the determination is made that the retrieved identification information does match the identification information of a known device (i.e., the retrieved identification information is found within a list of identification information associated with known devices), then the access device may continue monitoring received communications at 305. If the determination is made that the retrieved identification information does not match the identification information of any known device (i.e., the retrieved identification information is not found within the list of identification information associated with known devices), the process 300 may proceed to 330.

At 330, retrieved device identification information may be logged. In embodiments, the device identification module 215 may identify the wireless device from which the communication was received as an unexpected wireless device and may log the retrieved device identification information (e.g., MAC address or other unique identifier) at an unexpected device data store 225. It should be understood that various other information (e.g., time at which communication was received, duration for which the unexpected wireless device was detected within the premises, etc.) associated with the communication received from the unexpected wireless device may be stored at the unexpected device data store 225.

At 335, an unexpected device alert may be output. An unexpected device alert may be generated and output, for example, by an unexpected device alarm module 230 of FIG. 2. In embodiments, the unexpected device alert may provide a notification that an unexpected wireless device has been detected within a subscriber premises. The unexpected device alert may be output to an upstream alarm monitoring system (e.g., unexpected device alarm system 135 of FIG. 1), to a subscriber device (e.g., computer, STB, mobile device, tablet, or other personal device associated with the subscriber), to an alarm system within the subscriber premises, to an emergency services provider, or to another individual or entity. In embodiments, the unexpected device alert may be output to one or more other devices within the subscriber premises. For example, the access device may control the functioning of one or more devices connected to a home network based on the detection of an unexpected wireless device (e.g., turning on security lights in and/or around the premises, turning on security cameras positioned in and/or around the premises, sounding an alarm system, establishing a communication path between the premises and a home security provider, etc.).

Figure 4:
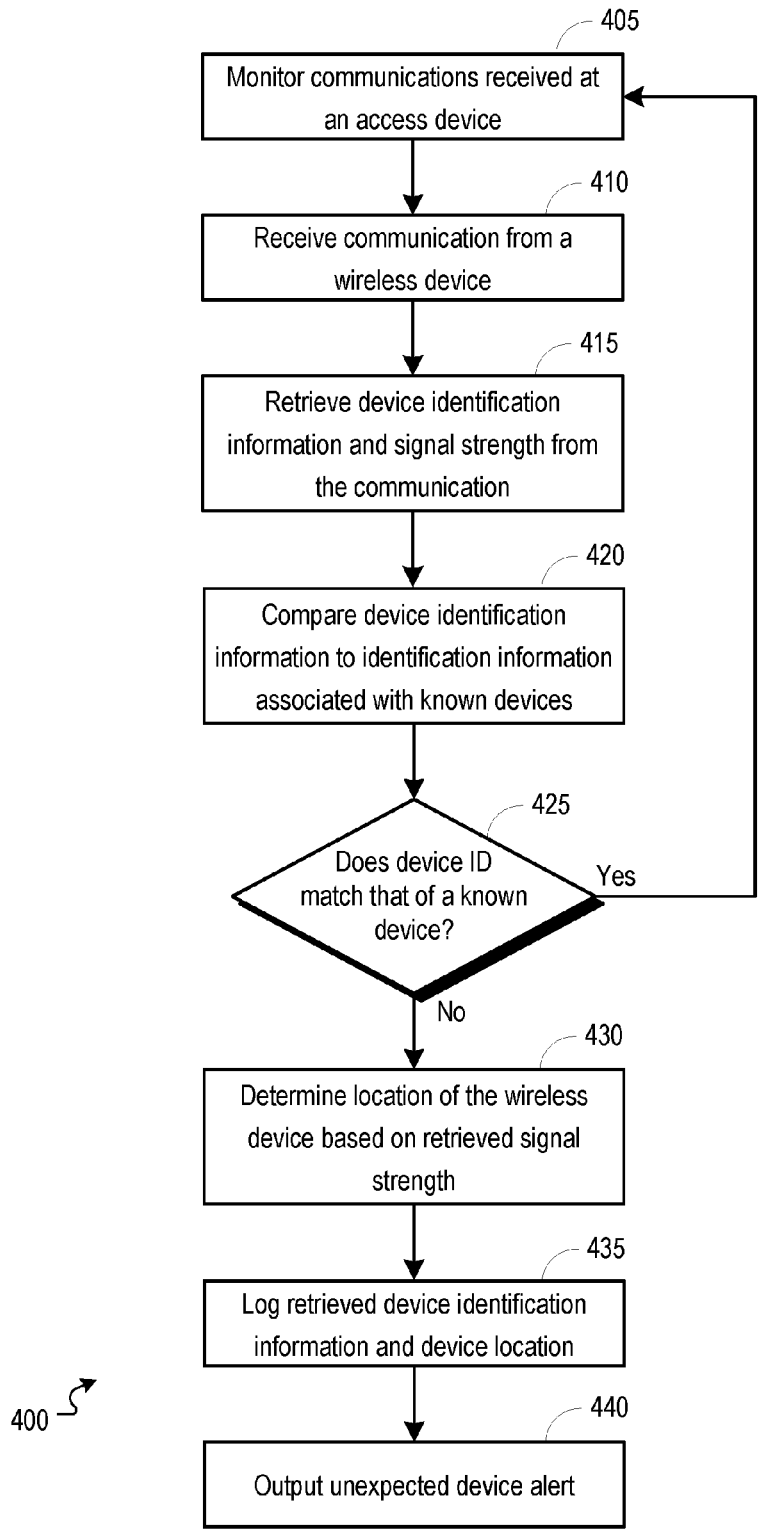
FIG. 4 is a flowchart illustrating an example process operable to generate an alert in response to a detection of an unexpected wireless device within a premises and to log the location of the unexpected wireless device.

FIG. 4 is a flowchart illustrating an example process 400 operable to generate an alert in response to a detection of an unexpected wireless device within a premises and to log the location of the unexpected wireless device. The process 400 may begin at 405, when received communications are monitored at an access device. An access device (e.g., gateway device 115 of FIG. 1, a network extender 120 of FIG. 1, a router, or any other access point) may monitor communications received from one or more wireless devices or stations when a security mode is enabled at the access device. For example, a user may manually enable a security mode at the access device or the access device may automatically (e.g., during a predetermined period of time, or upon the occurrence of a conditional event) enable a security mode. The access device may monitor communications received from wireless devices that are not associated with the access device as well as communications from wireless devices that are associated with the access device.

At 410, a communication may be received from a wireless device (e.g., client device 105 of FIG. 1). In embodiments, the communication may be a request for identification of local access devices (e.g., probe request message transmitted from a station during the 802.11 discovery process) or any other wireless communication received at a wireless interface (e.g., client interface 205 of FIG. 2) of the access device.

At 415, device identification information and an associated signal strength may be retrieved from the received communication. Device identification information and an associated signal strength may be retrieved from the communication, for example, by a device identification module 215 of FIG. 2. Device identification information may be carried within the received communication and may include a unique identifier (e.g., MAC address or other identifier) associated with the wireless device from which the communication was received. A signal strength associated with a signal operable to carry communications between the wireless device and access device may be carried by the communication (e.g., as a received signal strength indication (RSSI)) or may be determined by the access device.

At 420, the retrieved device identification information may be compared to identification information associated with one or more known devices. In embodiments, a device identification module 215 may compare the retrieved device identification information against identification information associated with one or more known devices (e.g., identification information such as MAC addresses or other unique device identifiers stored at a known device data store 220 of FIG. 2 or other location, device, or server). Known devices may include a group of devices designated by a subscriber, technician, MSO, or other entity as wireless devices that are expected to be found within the range of a wireless network provided by one or more access devices within a subscriber premises (e.g., wireless devices owned by residents of the subscriber premises or guests of the subscriber premises), and/or known devices may include one or more wireless devices that have been identified by an access device a predetermined number of times or over a predetermined duration of time.

At 425, a determination may be made whether the identification information retrieved from the received communication matches the identification information of a known device. The determination whether the retrieved identification information matches the identification information of a known device may be made, for example, by a device identification module 215. If the determination is made that the retrieved identification information does match the identification information of a known device (i.e., the retrieved identification information is found within a list of identification information associated with known devices), then the access device may continue monitoring received communications at 405. If the determination is made that the retrieved identification information does not match the identification information of any known device (i.e., the retrieved identification information is not found within the list of identification information associated with known devices), the process 400 may proceed to 430.

At 430, a location associated with the wireless device may be determined based on the signal strength retrieved from the communication. The location associated with the wireless device may be determined, for example, by a device identification module 215. In embodiments, the signal strength associated with the communication received from the wireless device may be used by the device identification module 215 to determine or estimate a location within a premises with respect to the location of the access device. For example, the signal strength may be used to estimate a physical distance between the access device and the wireless device. It should be understood that various other factors may be used to determine the proximity of the wireless device to the access device (e.g., obstacles between the access device and the wireless device such as walls or floors, comparable signal strengths received from other wireless devices having known locations within the premises, etc.).

In embodiments, the device identification module 215 may determine a relative direction of the wireless device by retrieving measurements of the strength of a signal received from the wireless device across a plurality of antennas/receivers associated with the access device (e.g., in the case of a multiple-input multiple-output (MIMO) access device) or across a plurality of segments of a single antenna/receiver (e.g., in the case of a single-input single-output (SISO) access device). For example, the location of the wireless device may be triangulated using the measured signal strengths at each of the plurality of antennas/receivers or plurality of antenna/receiver segments. In embodiments, the device identification module 215 may retrieve signal strength measurements from one or more other access devices within the subscriber premises, wherein each respective signal strength measurement is a measurement of the strength of a signal associated with a communication received from the wireless device at a respective access device. The device identification module 215 may determine the location of the wireless device based upon the signal strengths associated with the wireless device as received in communications at the one or more other access devices. For example, the signal strengths retrieved at the access device and the one or more other access devices may be triangulated using the retrieved signal strengths and relative positions of the access devices at which the signal strengths were retrieved.

At 435, retrieved device identification information and location information may be logged. In embodiments, the device identification module 215 may identify the wireless device from which the communication was received as an unexpected wireless device and may log the retrieved device identification information (e.g., MAC address or other unique identifier) and determined location information (e.g., signal strength associated with the received communication, determined or estimated location of the wireless device within the premises, etc.) at an unexpected device data store 225. It should be understood that various other information (e.g., time at which communication was received, duration for which the unexpected wireless device was detected within the premises, movements of the wireless device within the premises, etc.) associated with the communication received from the unexpected wireless device may be stored at the unexpected device data store 225.

At 440, an unexpected device alert may be output. An unexpected device alert may be generated and output, for example, by an unexpected device alarm module 230 of FIG. 2. In embodiments, the unexpected device alert may provide a notification that an unexpected wireless device has been detected within a subscriber premises. The unexpected device alert may be output to an upstream alarm monitoring system (e.g., unexpected device alarm system 135 of FIG. 1), to a subscriber device (e.g., STB, mobile device, tablet, or other personal device associated with the subscriber), to an alarm system within the subscriber premises, to an emergency services provider, or to another individual or entity. In embodiments, the unexpected device alert may be output to one or more other devices within the subscriber premises. For example, the access device may control the functioning of one or more devices connected to a home network based on the detection of an unexpected wireless device (e.g., turning on security lights in and/or around the premises, turning on security cameras positioned in and/or around the premises, sounding an alarm system, establishing a communication path between the premises and a home security provider, etc.).

Figure 5:
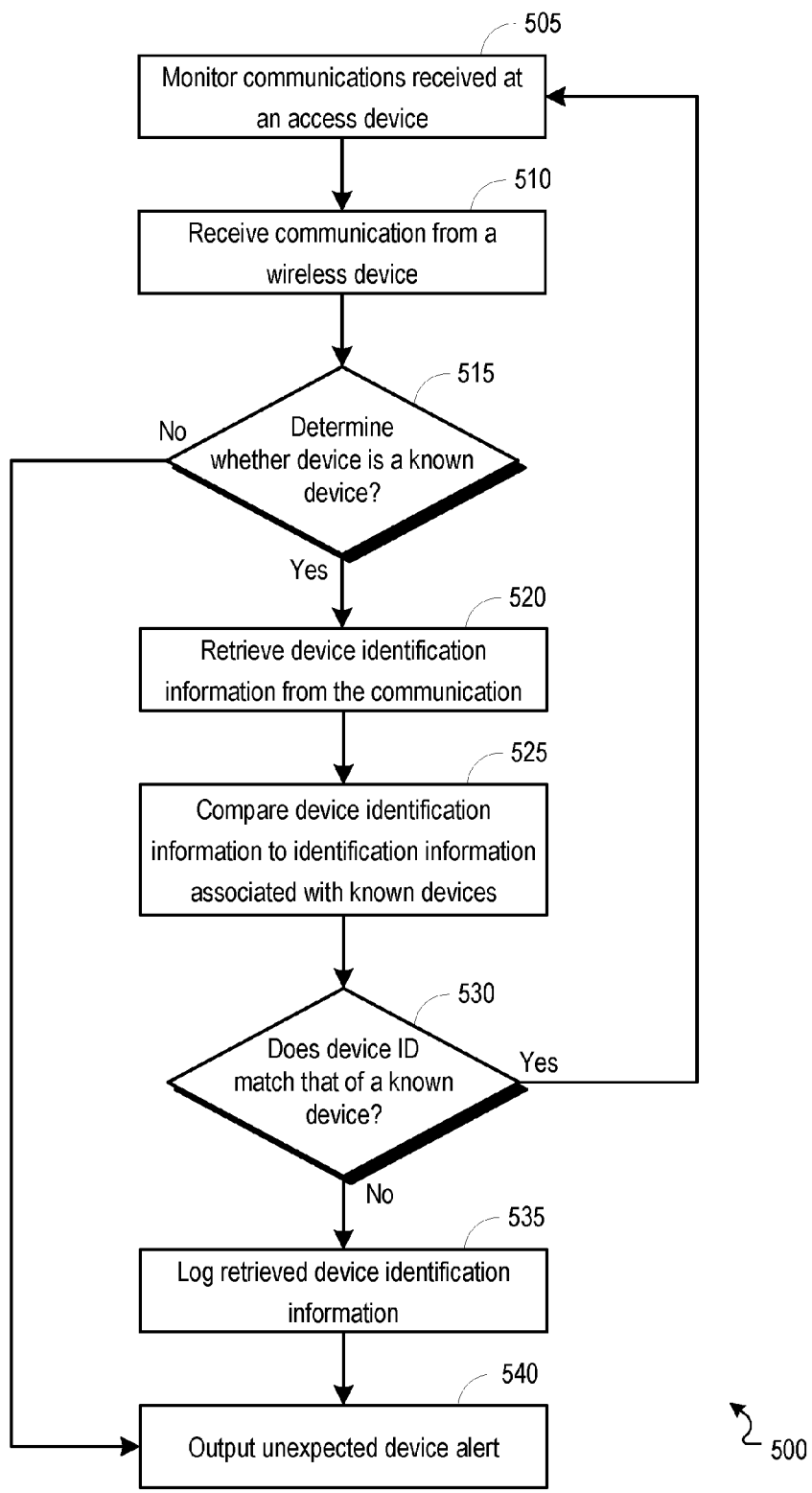
FIG. 5 is a flowchart illustrating an example process operable to generate an alert in response to a detection of a wireless device, wherein the wireless device is detected by an access device operating in an alarmed mode.

FIG. 5 is a flowchart illustrating an example process 500 operable to generate an alert in response to a detection of a wireless device, wherein the wireless device is detected by an access device operating in an alarmed mode. The process 500 may begin at 505, when received communications are monitored at an access device. An access device (e.g., gateway device 115 of FIG. 1, a network extender 120 of FIG. 1, a router, or any other access point) may monitor communications received from one or more wireless devices or stations when a security mode is enabled at the access device. For example, a user may manually enable a security mode at the access device or the access device may automatically (e.g., during a predetermined period of time, or upon the occurrence of a conditional event) enable a security mode. The access device may monitor communications received from wireless devices that are not associated with the access device (e.g., not paired or not authenticated with the access device) as well as communications from wireless devices that are associated with the access device (e.g., paired or authenticated with the access device).

At 510, a communication may be received from a wireless device (e.g., client device 105 of FIG. 1). In embodiments, the communication may be a request for identification of local access devices (e.g., probe request message transmitted from a station during the 802.11 discovery process) or any other wireless communication received at a wireless interface (e.g., client interface 205 of FIG. 2) of the access device.

At 515, a determination may be made whether a determination of the status of the wireless device as a known or unknown device is needed. The determination whether the status of the wireless device should be checked may be made, for example, by the device identification module 215 of FIG. 2 and/or the unexpected device alarm module 230 of FIG. 2. In embodiments, the access device may be operating in an alarmed mode (e.g., armed security mode such as an away, vacation or work setting) wherein the access device is configured to immediately alert a detection of a wireless device while operating in the alarmed mode. For example, if the access device is operating in an alarmed mode, the access device may alert the detection of a wireless device without first checking whether the detected device is a known device. If the access device is not operating in an alarmed mode, the determination may be made that the status of the detected wireless device should be checked, and the process 500 may proceed to 520. The operating status of the access device may be controlled, for example, by the unexpected device alarm module 230.

At 520, device identification information may be retrieved from the received communication. Device identification information may be retrieved from the communication, for example, by a device identification module 215 of FIG. 2. In embodiments, device identification information may be carried within the received communication and may include a unique identifier (e.g., MAC address or other identifier) associated with the wireless device from which the communication was received.

At 525, the retrieved device identification information may be compared to identification information associated with one or more known devices. In embodiments, a device identification module 215 may compare the retrieved device identification information against identification information associated with one or more known devices (e.g., identification information such as MAC addresses or other unique device identifiers stored at a known device data store 220 of FIG. 2 or other location, device, or server). Known devices may include a group of devices designated by a subscriber, technician, MSO, or other entity as wireless devices that are expected to be found within the range of a wireless network provided by one or more access devices within a subscriber premises (e.g., wireless devices owned by residents of the subscriber premises or guests of the subscriber premises), and/or known devices may include one or more wireless devices that have been identified by an access device a predetermined number of times or over a predetermined duration of time. It should be understood that an access device may be configured with a list of known devices or an update to known devices by a subscriber, technician, installer, or other MSO-controlled entity.

At 530, a determination may be made whether the identification information retrieved from the received communication matches the identification information of a known device. The determination whether the retrieved identification information matches the identification information of a known device may be made, for example, by a device identification module 215. If the determination is made that the retrieved identification information does match the identification information of a known device (i.e., the retrieved identification information is found within a list of identification information associated with known devices), then the access device may continue monitoring received communications at 505. If the determination is made that the retrieved identification information does not match the identification information of any known device (i.e., the retrieved identification information is not found within the list of identification information associated with known devices), the process 500 may proceed to 535.

At 535, retrieved device identification information may be logged. In embodiments, the device identification module 215 may identify the wireless device from which the communication was received as an unexpected wireless device and may log the retrieved device identification information (e.g., MAC address or other unique identifier) at an unexpected device data store 225. It should be understood that various other information (e.g., time at which communication was received, duration for which the unexpected wireless device was detected within the premises, etc.) associated with the communication received from the unexpected wireless device may be stored at the unexpected device data store 225.

At 540, an unexpected device alert may be output. An unexpected device alert may be generated and output, for example, by an unexpected device alarm module 230 of FIG. 2. In embodiments, the unexpected device alert may provide a notification that an unexpected wireless device has been detected within a subscriber premises. The unexpected device alert may be output to an upstream alarm monitoring system (e.g., unexpected device alarm system 135 of FIG. 1), to a subscriber device (e.g., computer, STB, mobile device, tablet, or other personal device associated with the subscriber), to an alarm system within the subscriber premises, to an emergency services provider, or to another individual or entity. In embodiments, the unexpected device alert may be output to one or more other devices within the subscriber premises. For example, the access device may control the functioning of one or more devices connected to a home network based on the detection of an unexpected wireless device (e.g., turning on security lights in and/or around the premises, turning on security cameras positioned in and/or around the premises, sounding an alarm system, establishing a communication path between the premises and a home security provider, etc.).

Returning to 515, if the determination is made that a determination whether the detected wireless device is a known device is not needed, the process 500 may proceed to 540. For example, if the access device is operating in an alarmed mode when the wireless device is detected, the access device may immediately output the unexpected device alert without first checking whether the detected wireless device is a known device.

Figure 6:
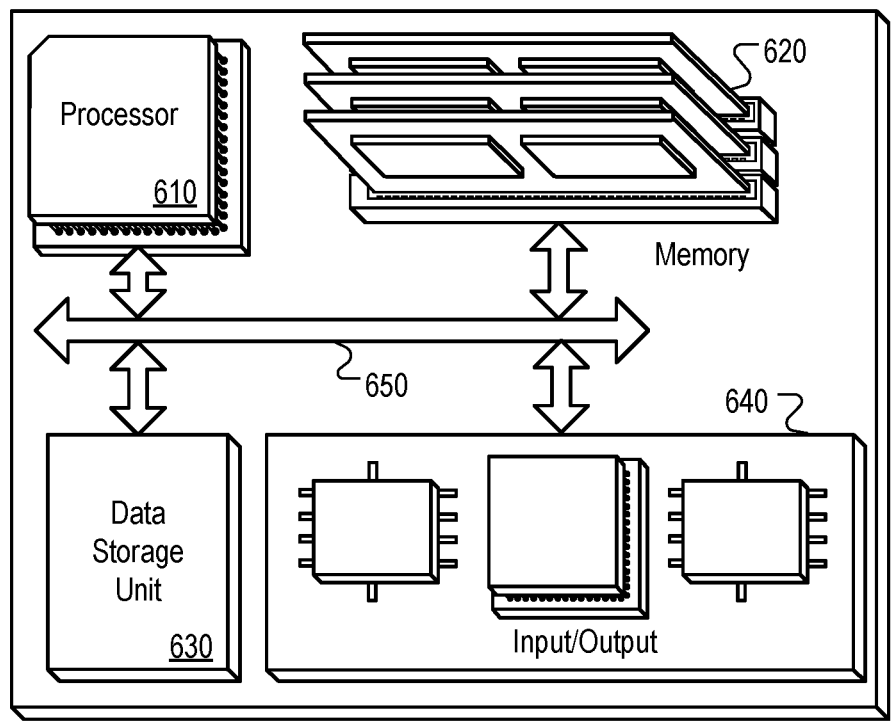
FIG. 6 is a block diagram of a hardware configuration operable to generate an alert in response to a detection of an unexpected wireless device within a premises.

FIG. 6 is a block diagram of a hardware configuration 600 operable to generate an alert in response to a detection of an unexpected wireless device within a premises. The hardware configuration 600 can include a processor 610, a memory 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In one implementation, the input/output device 640 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, and/or data services to an access device (e.g., gateway device 115 of FIG. 1, network extender 120 of FIG. 1, etc.) or a client device (e.g., client device 105 of FIG. 1 such as a television, mobile device, tablet, STB, personal device, IoT device, etc.). In embodiments, the input/output device can include driver devices configured to send communications to, and receive communications from one or more networks (e.g., local network, broadband network 130 of FIG. 1, WAN 125 of FIG. 1, etc.).

Those skilled in the art will appreciate that the invention improves upon methods and systems for detecting and alerting the presence of an intruder within a premises. Methods, systems, and computer readable media can be operable to generate an alert in response to a detection of an unexpected wireless device within a premises. An access device may receive a communication from a wireless device and may retrieve identification information associated with the wireless device from the communication. The access device may compare the retrieved identification information to identification information associated with one or more known devices, and if the retrieved identification information does not match the identification information associated with any of the known devices, the access device may identify the wireless device as an unexpected wireless device. The access device may output an alert providing a notification that an unexpected wireless device has been detected within an associated premises.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   while a security mode is enabled at an access device, receiving a communication from a wireless device, wherein the communication comprises a probe request message, wherein the probe request message comprises device identification information associated with the wireless device, and wherein the communication is received at the access device;
   retrieving the device identification information from the communication;
   comparing the retrieved device identification information to device identification information associated with one or more known devices that are included within a list of known devices, wherein device identification information for each respective one known device of the one or more known devices is added to the list of known devices when the access device receives a communication from the respective one known device while the security mode is disabled at the access device;
   determining that the retrieved device identification information does not match device identification information associated with any of the one or more known devices;
   identifying the wireless device as an unexpected wireless device based on the determination that the retrieved device identification information does not match device identification information associated with any of the one or more known devices; and
   outputting an alert, wherein the alert comprises a notification of the identification of the wireless device as an unexpected wireless device.

2. The method of claim 1, further comprising:
   retrieving an indication of the strength of a signal between the wireless device and one or more access devices; and
   based upon the measured strength of the signal between the wireless device and the one or more access devices, determining a location of the wireless device relative to the one or more access devices, wherein the location of the wireless device relative to the one or more access devices comprises a distance between the wireless device and the one or more access devices and a direction of the wireless device with respect to one or more of the access devices.

3. The method of claim 1, further comprising:
   storing the retrieved device identification information; and
   storing a time at which the communication was received from the wireless device.

4. The method of claim 1, wherein the alert is output to a remote server.

5. The method of claim 1, wherein the alert is output to a security device within a corresponding premises, the alert causing the activation of the security device.

6. The method of claim 1, wherein the retrieved device identification information comprises a media access control (MAC) address.

7. An access device comprising:
   one or more interfaces configured to be used to receive a communication from a wireless device while a security mode is enabled at the access device, wherein the communication comprises a probe request message, wherein the probe request message comprises device identification information associated with the wireless device;
   one or more modules configured to:
   retrieve device identification information from the communication;
   compare the retrieved device identification information to device identification information associated with one or more known devices that are included within a list of known devices, wherein device identification information for each respective one known device of the one or more known devices is added to the list of known devices when the access device receives a communication from the respective one known device while the security mode is disabled at the access device;
   determine that the retrieved device identification information does not match device identification information associated with any of the one or more known devices; and
   identify the wireless device as an unexpected wireless device based on the determination that the retrieved device identification information does not match device identification information associated with any of the one or more known devices; and
   wherein the one or more interfaces are further configured to be used to output an alert, the alert comprising a notification of the identification of the wireless device as an unexpected wireless device.

8. The apparatus of claim 7, wherein:
   the one or more interfaces are further configured to be used to retrieve an indication of the strength of a signal between the wireless device and one or more access devices; and
   the one or modules are further configured to, based upon the measured strength of the signal between the wireless device and the one or more access devices, determine a location of the wireless device relative to the one or more access devices, wherein the location of the wireless device relative to the one or more access devices comprises a distance between the wireless device and the one or more access devices and a direction of the wireless device with respect to one or more of the access devices.

9. The apparatus of claim 7, wherein the alert is output to a remote server.

10. The apparatus of claim 7, wherein the alert is output to a security device within a corresponding premises, the alert causing the activation of the security device.

11. The apparatus of claim 7, wherein the retrieved device identification information comprises a media access control (MAC) address.

12. One or more non-transitory computer readable media having instructions operable to cause one or more processors to perform the operations comprising:
   while a security mode is enabled at an access device, receiving a communication from a wireless device, wherein the communication is received by the access device, and wherein the communication received at the access device from the wireless device comprises a probe request message, wherein the probe request message comprises device identification information associated with the wireless device;
   retrieving the device identification information from the communication;
   comparing the retrieved device identification information to device identification information associated with one or more known devices that are included within a list of known devices, wherein device identification information for each respective one known device of the one or more known devices is added to the list of known devices when the access device receives a communication from the respective one known device while the security mode is disabled at the access device;

determining that the retrieved device identification information does not match device identification information associated with any of the one or more known devices;

identifying the wireless device as an unexpected wireless device based on the determination that the retrieved device identification information does not match device identification information associated with any of the one or more known devices; and outputting an alert, wherein the alert comprises a notification that an unexpected wireless device has been detected within a premises associated with the access device.

13. The one or more non-transitory computer-readable media of claim 12, wherein the instructions are further operable to cause one or more processors to perform the operations comprising:

retrieving an indication of the strength of a signal between the wireless device and the access device; and based upon the measured strength of the signal between the wireless device and the access device, determining a location of the wireless device relative to the location of the access device, wherein the location of the wireless device relative to the location of the access device comprises a distance between the wireless device and the access device and a direction of the wireless device with respect to the location of the access device.

14. The one or more non-transitory computer-readable media of claim 12, wherein the instructions are further operable to cause one or more processors to perform the operations comprising:

storing the retrieved device identification information; and storing a time at which the communication was received from the wireless device.

15. The one or more non-transitory computer-readable media of claim 14, wherein the retrieved device identification information comprises a media access control (MAC) address.

16. The one or more non-transitory computer-readable media of claim 12, wherein the alert is output to a remote server.

17. The one or more non-transitory computer-readable media of claim 12, wherein the alert is output to a security device within the premises associated with the access device, the alert causing the activation of the security device.

* * * * *